Patented Feb. 7, 1933

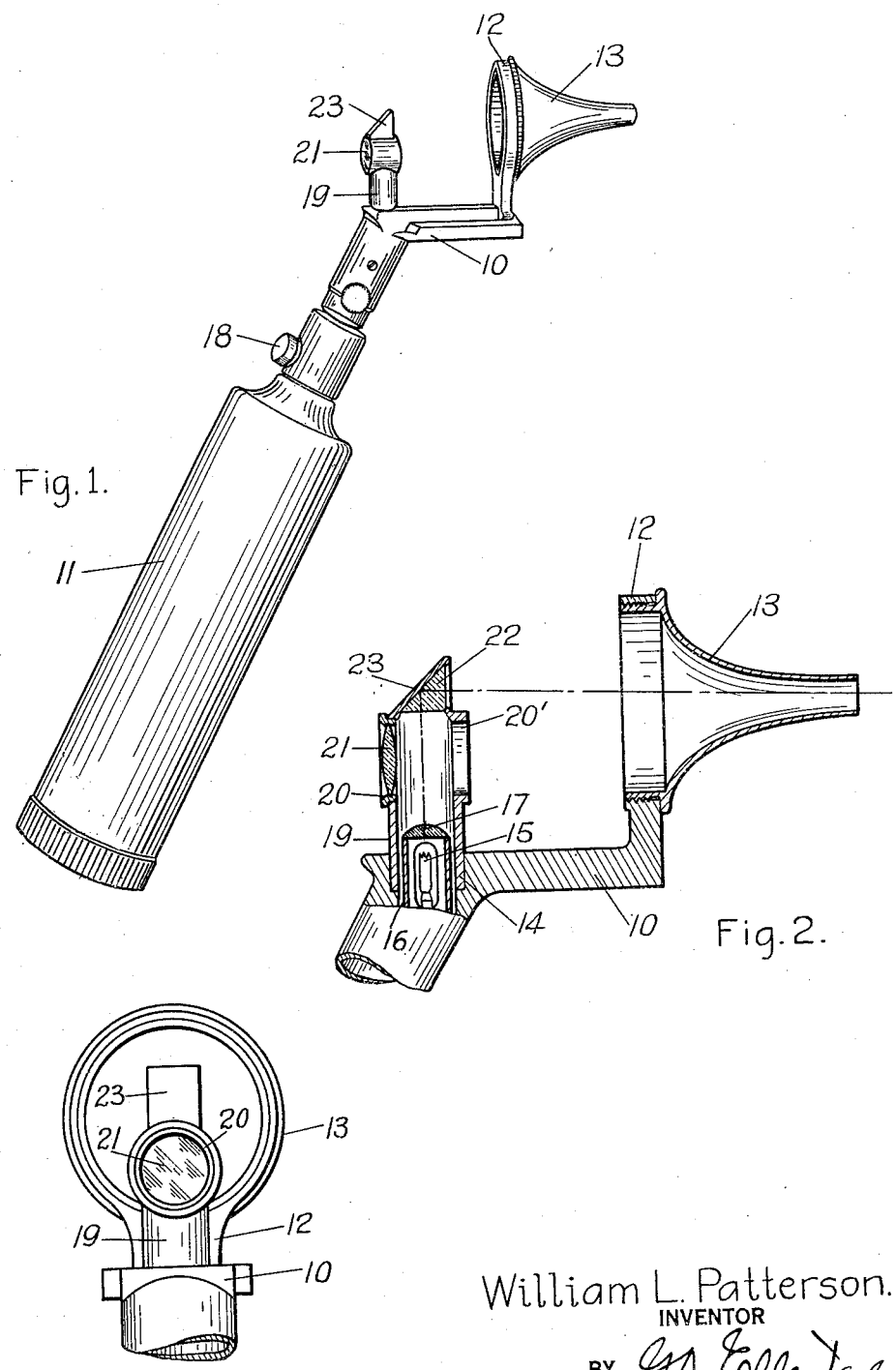

1,896,720

UNITED STATES PATENT OFFICE

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK

OTOSCOPE

Application filed June 7, 1929. Serial No. 369,088.

This invention relates to diagnostic instruments and more particularly it has reference to an instrument such as is used for making examinations of the aural cavities of the body and the like.

One of the objects of the present invention is to provide an improved form of illuminated otoscope. Another object is to provide an improved instrument of the character described having illuminating means and observing means which will permit the relatively free and easy introduction and manipulation of operating instruments into the speculum. Another object is to provide an otoscope which will be relatively simple in structure though efficient in operation. These and other objects reside in certain novel features of construction, arrangement and combination of parts as will hereinafter be more fully described and pointed out in the appended claim.

Referring to the drawing:

Fig. 1 shows a side view of the instrument embodying my invention.

Fig. 2 shows a vertical sectional view of the head of the instrument.

Fig. 3 shows an end view of the head of the instrument as seen from the left side of Fig. 2.

One embodiment of my invention is illustrated in the drawing wherein 10 indicates a support or bracket which is detachably secured to a suitable handle member 11. Attached to one end of bracket 10 is a threaded ring 12 to which a speculum 13 is detachably secured, thereby permitting the use of specula having sight openings of different sizes.

The other end of bracket 10 has an opening 14 in which is mounted a light source such as the incandescent lamp 15 which is surrounded by a tubular member 16 carrying lens 17. Current for the lamp 15 is supplied by a suitable battery, not shown, carried in handle 11 and controlled by switch 18.

Removably mounted in the opening 14 is the vertically extending casing 19 in the walls of which are provided the two registering sight openings 20 and 20'. A suitable magnifying lens 21 may be mounted in opening 20. Positioned at the top of casing 19, just above the sight openings, is a reflecting means such as prism 22 which is held by a suitable mounting 23.

In operation, closing of the circuit by switch 18 lights the lamp 15 to send light rays upwardly through the lens 17 and onto the inclined face of prism 22 from which they are reflected into the speculum 13. This provides a very efficient illumination of the object which is under observation through the lens 21 since the path of reflected rays is very close and almost parallel to the direct line of sight through lens 21. Furthermore, the illuminating and observing means are of such a size and so disposed that they produce very little interference to the insertion and manipulation of operating instruments in the speculum.

From the foregoing it will be apparent that I am able to attain the objects of my invention and provide an efficient illuminated otoscope. Various modifications can obviously be made without departing from the spirit of my invention as pointed out in the appended claim.

I claim:

An otoscope comprising a support, a speculum mounted at one end of said support, a light source mounted at the other end of said support, a vertical tubular casing surrounding said light source, a reflector positioned at the top of said casing for reflecting light rays from said source into said speculum, said casing having two aligned sight openings in its wall, said openings being located between said reflector and said light source and in visual alignment with said speculum, a lens in one of said openings whereby an object may be viewed through said lens and speculum.

WILLIAM L. PATTERSON.